J. J. AHEARN.
AUTOMOBILE DIRECTION SIGNAL.
APPLICATION FILED OCT. 17, 1918. RENEWED JUNE 8, 1920.
1,364,063.
Patented Jan. 4, 1921.
2 SHEETS—SHEET 1.
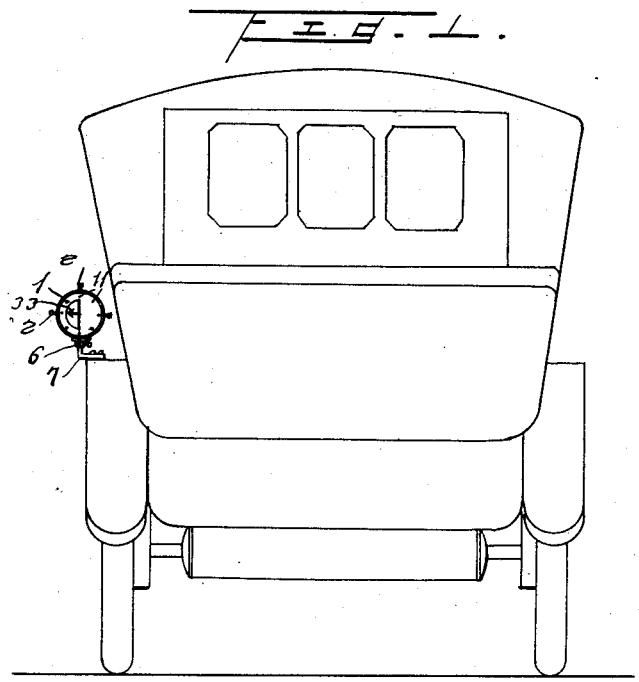
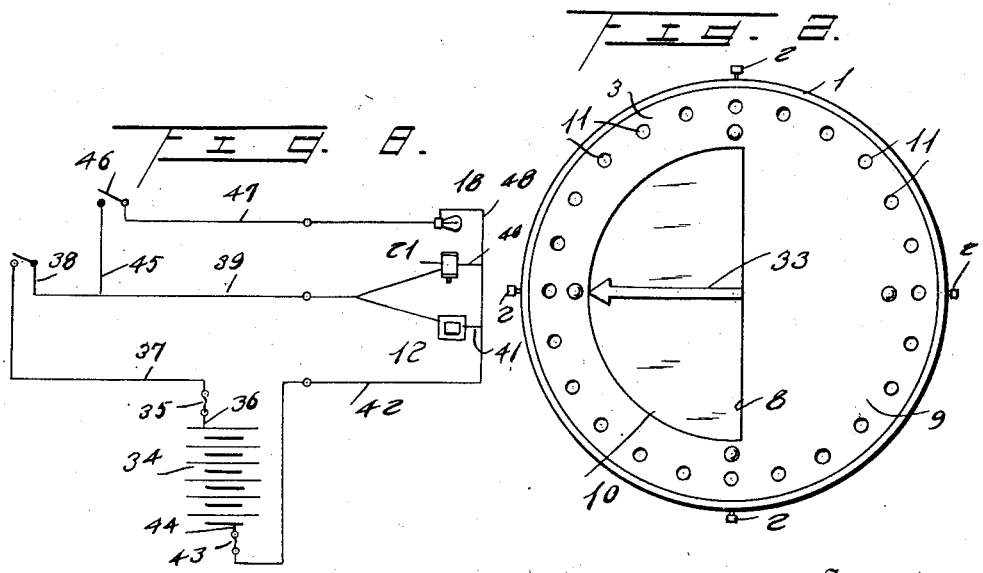
Inventor
J. J. AHEARN.
Attorney

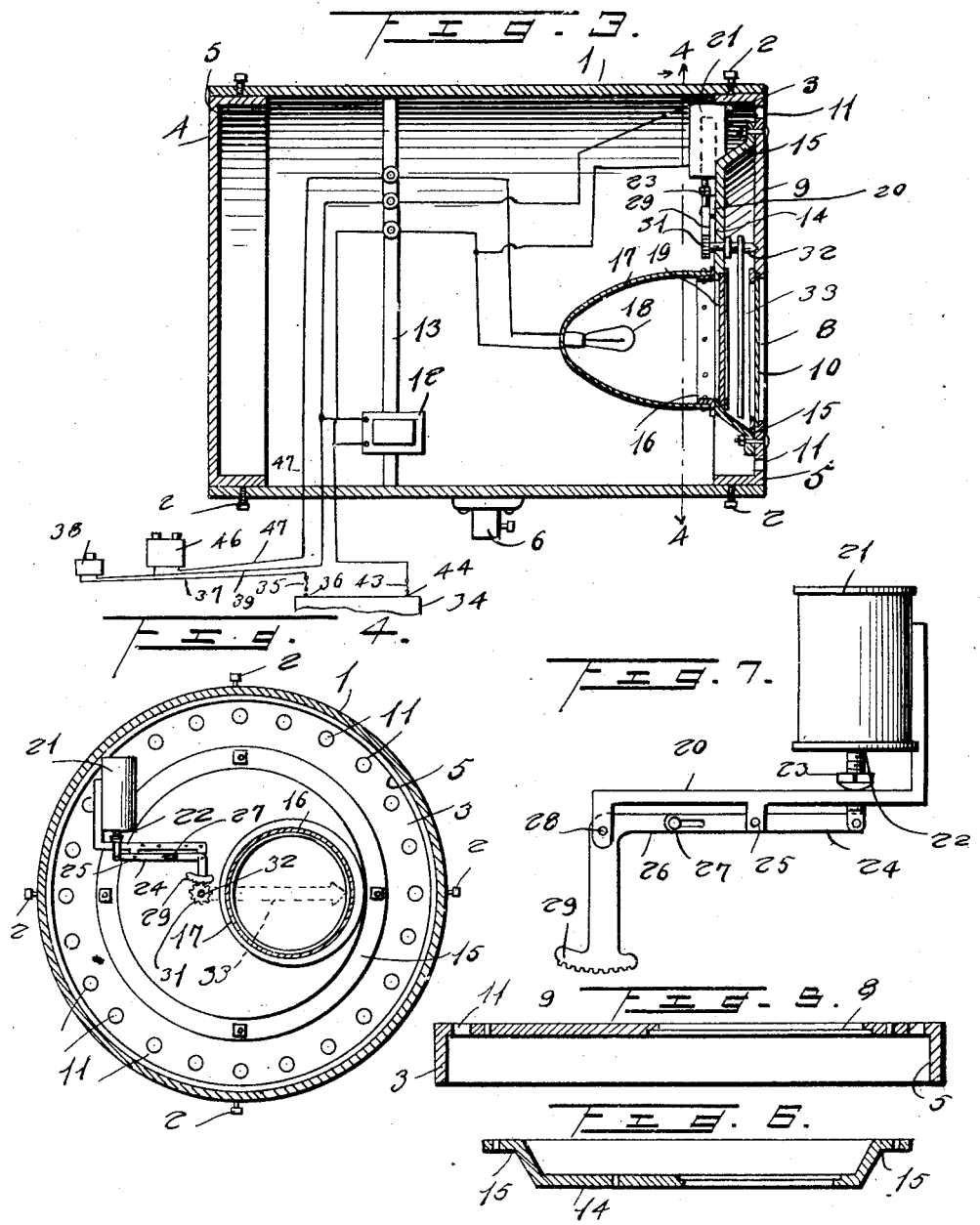

UNITED STATES PATENT OFFICE.

JOHN J. AHEARN, OF PALMER, NEW YORK, ASSIGNOR OF ONE-FOURTH TO PATRICK AHEARN, OF CORINTH, NEW YORK.

AUTOMOBILE DIRECTION-SIGNAL.

1,364,063.　　　　Specification of Letters Patent.　　Patented Jan. 4, 1921.

Application filed October 17, 1918, Serial No. 258,549. Renewed June 8, 1920. Serial No. 387,514.

*To all whom it may concern:*

Be it known that I, JOHN J. AHEARN, a citizen of the United States, residing at Palmer, in the county of Saratoga and State of New York, have invented certain new and useful Improvements in Automobile Direction-Signals; and I do hereby declare the following to be a full, clear, and exact description of the invention, such as will enable others skilled in the art to which it appertains to make and use the same.

This invention relates to improvements in automobile direction signals and has for one of its objects the provision of a casing having a pivoted signal normally occupying a vertical or non-signaling position, and is adapted to be electrically swung to a horizontal or signaling position at the will of the operator to indicate a turn from a straight is to be made by the automobile, thus informing the traffic in rear thereof in sufficient time to prevent collisions and accidents.

Another object of this invention is the provision of means upon the casing adapted to hide the signal from view when in a non-signaling position.

A further object of this invention is the provision of means for illuminating the signal when moved into a signaling position so as to render the same visible at nighttime.

A still further object of this invention is the provision of an automobile direction signal of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a rear elevation of an automobile illustrating my invention applied thereto, Fig. 2 is a front elevation of a direction signal constructed in accordance with my invention, Fig. 3 is a vertical sectional view of the same, Fig. 4 is a transverse sectional view illustrating the manner of operating the signaling member, Fig. 5 is a detail sectional view of an outer cover, Fig. 6 is a detail sectional view of an inner cover carried by the outer cover, Fig. 7 is a front elevational view of the means of operating the signaling member.

Fig. 8 is a diagrammatical view of the wiring diaphragm.

Referring in detail to the drawings, the numeral 1 indicates a substantially cylindrical casing having each end open and provided at its edges with set screws 2 for securing front and rear walls 3 and 4 to the ends of the casing. The front and rear walls 3 and 4 have formed thereon annular flanges 5 which fit within the ends of the casing 1 and are secured therein by the set screws 2. A stud 6 is formed upon the bottom of the casing 1 for attachment with a suitable bracket 7 which is adapted to be secured to the rear end of the automobile at any desired point preferably upon the left hand side thereof. The front wall 3 has a semicircular opening 8 and a solid portion 9. The semi-circular opening 8 is closed by a transparent panel 10. A plurality of openings 11 are formed within the front wall 3 about the edges thereof for permitting the sound from an alarm 12 to escape from the casing. The alarm 12 may be in the form of an electrical horn, buzzer, or bell, and is supported by a suitable strip 13 secured to the wall of the casing 1.

An inner plate 14 has formed thereon an annular flange 15 which is bolted or otherwise secured to the inner face and adjacent the edge of the front plate 3 and has formed therein a circular opening adapted to register with the opening 8 of said front plate. A flange 16 is formed upon the inner plate 14 about the opening thereof and is disposed inwardly within the casing and has connected thereto a reflector 17 adapted to carry an electric lamp 18. A glass panel 19 closes the opening within the inner plate 14 and is carried by the flange 16 and is preferably colored green, but may be of any other desired color.

A suitable frame 20 is secured to the inner plate 14 at the solid portion thereof and has mounted thereon a solenoid 21 provided with a core 22. The solenoid 21 is disposed vertically within the casing and the core 22 is screw threaded to receive an adjusting nut 23 for the purpose of limiting the upward movement of the core within the solenoid when energized.

An arm 24 has one end pivoted to the lower end of the core 22 and is pivotally mounted to the frame 20 as illustrated at 25 having its other end connected to one arm of a bell crank 26 by a pin and slot connection 27. The bell crank 26 is pivoted to the frame 20 as illustrated at 28 and has formed upon its other arm portion an arcuate shaped member 29 provided with teeth 30 adapted to mesh with a pinion 31 secured to a shaft 32. The shaft 32 is journaled in the solid portion of the inner plate 14 and carries at its outer end a vertically disposed signaling member 33 in the form of an arrow, but may be of any other desired construction. The signaling member 33, as before stated is normally disposed vertically and in rear of the solid portion 9 of the front wall 3, so that the same is hidden from view when in a non-signaling position. When the solenoid 21 is energized, the core 22 is drawn within the same swinging the signaling member 33 to a horizontal or signaling position in view and at the rear of the transparent panel disposed within the opening of the front wall 3 and in advance of the colored panel 19.

A storage battery or other electrical source 34 has connected to one pole thereof a fuse 35 by a conductor 36 and has connected to its other end a conductor 37 which is in turn connected to a controlling switch 38 preferably located upon the steering wheel or steering post of the automobile. A conductor 39 is connected to the switch 38 and is connected to the solenoid 21 and the alarm 12. Conductors 40 and 41 are connected to the solenoid and the alarm respectively, and have their other ends connected to a conductor 42 connected to a fuse 43. The fuse 43 is connected to the other pole of the battery 34 by a conductor 44. A conductor 45 is connected to the conductor 39 and to a switch 46 adapted to be located upon the instrument board of the automobile. A conductor 47 is connected to the switch 46 and to the electric lamp 18 which has connected thereto a conductor 48 that is connected to the conductor 42.

In operation when using the signal in the day time, the operator of the automobile closes the switch 38 which completes an electric circuit to the alarm 12 and to the solenoid causing both to be actuated which moves the signaling member 33 into signaling position indicating that a turn from a straight course is contemplated also attracting the attention of traffic to the signaling member. When the solenoid is deenergized, the core 22 thereof falls by gravity returning the signaling member 33 to a non-signaling position in rear of the solid portion 9 of the front wall 3. When using the device at night time, the switch 46 is closed and when the operator closes the switch 38 to actuate the signal and the alarm, the electric lamp 18 is simultaneously illuminated and thereby illuminating the signaling member 33 when moving into signaling position.

While I have shown and described the preferred embodiment of my invention, it will be understood that minor changes in construction, combination, and arrangement of parts may be made without departing from the spirit and scope of the invention, as claimed.

Having thus described my invention, what I claim is:—

1. An automobile signal comprising a casing, a front wall for said casing, an inner wall secured to said front wall and spaced therefrom, a shaft journaled in the inner wall, said inner and outer walls having openings in alinement with each other, transparent means closing said openings, a signaling member connected to said shaft and disposed between the transparent means and normally occupying a position in rear of the solid portion of the front wall, a frame secured to the inner wall, a solenoid carried by said frame and disposed vertically, a core within said solenoid, an arm pivoted to the lower end of the core, a bell crank lever pivoted to said frame and having one arm connected to said arm, an arcuate shaped member formed upon the other arm of the bell crank lever, a gear secured to said shaft, teeth formed on said arcuate shaped member and in mesh with the gear, and means energizing the solenoid.

2. An automobile direction signal comprising a cylindrical casing, a front wall detachably secured to the casing, an inner wall secured to said front wall and spaced therefrom, said walls having alining openings, transparent means closing said openings, a signaling member journaled to the inner wall and disposed between the same and the outer wall and normally occupying a position in rear of the solid portion of the front wall, means connected to said signaling member to swing the same into signaling position and between the transparent closing means, a flange formed upon the inner wall about said openings, a reflector carried by said flange, and illuminating means carried by said reflector.

In testimony whereof I affix my signature in presence of two witnesses.

JOHN J. AHEARN.

Witnesses:
ALICE V. K. AHEARN,
MARY E. AHEARN.